DECODER CIRCUITS

Filed Dec. 27, 1957 2 Sheets-Sheet 1

INVENTORS
WILLIAM E. BARNETTE &
HARRY KIHN
BY Charles H. Brown
ATTORNEY

DECODER CIRCUITS

Filed Dec. 27, 1957 2 Sheets-Sheet 2

INVENTORS
WILLIAM E. BARNETTE &
HARRY KIHN
BY Charles H. Brown
ATTORNEY

United States Patent Office
3,110,016
Patented Nov. 5, 1963

3,110,016
DECODER CIRCUITS

William E. Barnette, Levittown, Pa., and Harry Kihn, Lawrenceville, N.J., assignors to Radio Corporation of America, a corporation of Delaware Filed Dec. 27, 1957, Ser. No. 705,663
21 Claims. (Cl. 340—174)

Figure 1:
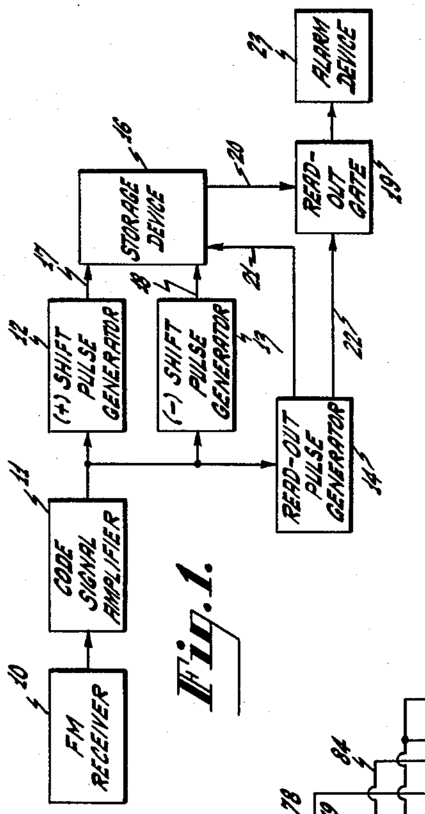

The invetnion relates to decoder circuits, and, particularly, to a magnetic core-transistor decoder circuit.

A decoder circuit is generally defined as a circuit arrangement adapted to perform some function in response to a predetermined code signal. A number of decoder circuits each responsive to a different code signal can be used in a system such that the different decoder circuits are selectively operated to perform their respective functions in a desired manner or sequence. One application of such a system is in the field of communications. By arranging the decoder circuits to operate alarm or similar devices, a calling system is provided by which the various subscribers to the system can be selectively paged or alerted to perform some activity. Both mechanical and electronic decoder circuits are known. The mechanical circuits make use of a number of relay and other mechanical switching devices, while the electronic circuits make use of a number of vacuum tubes and associated equipment. The number of vacuum tubes used in the electronic circuits requires the use of adequate power supplies and apparatus such as blowers for dissipating the heat generated by the tubes.

Increasing attention in the design and construction of equipment used in the field of electronics is being given to the conservation of space and to a reduction in the number of components. Size and weight are often critical factors to be considered in successfully building such equipment. Because of the number and size of the components required, it is difficult, if not impossible, to design decoder circuits using the mechanical and electronic decoder circuits now known which are small enough in construction and sufficiently light in weight to be useful in certain applications. The necessity of providing large power supplies and other apparatus creates many problems in any attempt to reduce the size or bulk and weight of the circuits. For example, it may be desirable to include the decoder circuits in equipment which is sufficiently small and lightweight in construction to be carried on the person as in a paging system. Equipment of this type using either the mechanical or electronic circuits now known would tend to be bulky and awkward to handle or slow in response requiring long signalling periods, thereby greatly decreasing its value and possibility of use. A definite need exists in the art for a decoder circuit which is small and capable of being made very compact in construction. In addition, it is highly desirable that the decoder circuit should be as dependable and as fast or faster in operation than the decoder circuits presently available.

An object of the invention is to obtain an improved decoder circuit which is simpler in construction and in operation than the decoder circuits now known.

Another object of the invention is to provide an improved magnetic core-transistor decoder circuit adapted to perform a given function in response to a predetermined code signal, the decoder circuit so provided being both smaller in construction and simpler in operation than the decoder circuits now known.

Still another object of the invention is to obtain an improved portable and lightweight decoder circuit which can be carried on the person and requires a low voltage power supply.

Briefly, the objects of the invention are accomplished by a decoder circuit including a read-in, read-out and storage circuit. The storage circuit preferably includes a transistorized magnetic core shift register. The shift register is arranged so that a single electrical condition stored in the first magnetic core of the shift register in standby condition can be advanced from magnetic core to magnetic core through the shift register in response to trigger pulses selectively applied to the magnetic cores.

A code signal including a series of positive and negative (preferably half sine wave) pulses followed by a read-out or control pulse is applied from suitable receiving equipment to a transistor amplifier included in the read-in circuit of the decoder circuit.

In addition to the transistor amplifier, the read-in circuit includes a first and second transistor monocycle (one shot) oscillator type trigger generator. The first generator, hereinafter referred to as the positive (+) shift pulse generator, is responsive to each positive pulse of the incoming code signal applied thereto from the amplifier to apply a trigger pulse to certain ones of the magnetic cores of the shift register in the storage circuit. The second generator, hereinafter referred to as the negative (−) shift pulse generator, is responsive to each negative pulse of the incoming code signal applied thereto from the amplifier to apply a trigger pulse to the other or remaining magnetic cores of the shift register. The positive and negative shift pulse generators are connected to selectively trigger the magnetic cores in the shift register so that, when a predetermined series arrangement of positive and negative half sine wave pulses included in an incoming code signal is fully received by the decoder circuit, the above-mentioned single electrical condition will have been advanced from magnetic core to magnetic core through the shift register and is stored in the last magnetic core of the shift register.

Following the complete reception of the series of half sine wave pulses by the read-in circuit, a third transistor monocycle oscillator type trigger generator included in the read-out circuit is operated in response to the read-out pulse included in the incoming code signal and applied thereto from the transistor amplifier to apply a first current pulse to a gating circuit also included in the read-out circuit. The third generator will hereinafter be referred to as the read-out pulse generator. The reception of the read-out pulse by the decoder circuit also causes, according to the polarity of the read-out pulse, either the positive or the negative shift pulse genertor to trigger the last magnetic core of the shift register in the storage circuit. By this action, the single electrical condition is advanced out of the last magnetic core of the shift register, resulting in a second current pulse being applied to the gating circuit. The gating circuit functions in response to the reception thereby of the first and second current pulses to energize an alarm or to complete some desired activity, indicating the reception by the decoder circuit of the predetermined or correct code signal. The first current pulse produced by the read-out pulse generator is also applied to the magnetic cores of the shift register in the storage circuit to reset the shift register to its original or standby condition in which the single electrical condition is stored in the first magnetic core of the shift register.

If a code signal including a series arrangement of half sine wave pulses other than the predetermined series arrangement of half sine wave pulses is received by the decoder circuit, the single electrical condition will not be stored in the last magnetic core of the shift register at the time of the read-out pulse. As a result, the second current pulse referred to above is not produced. The gating circuit is responsive only to the reception thereby of both the first and second current pulses, and remains inoperative in response to the first current pulse in the absence of the second current pulse. By the operation described, the decoder circuit is only operated to perform a desired action such as the operation of an alarm device in response to the reception by the decoder circuit of a correct and predetermined code signal. The decoder circuit is arranged to perform no action in response to a code signal other than the predetermined code signal.

Figure 2A:
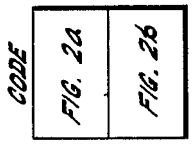
Figure 2A:
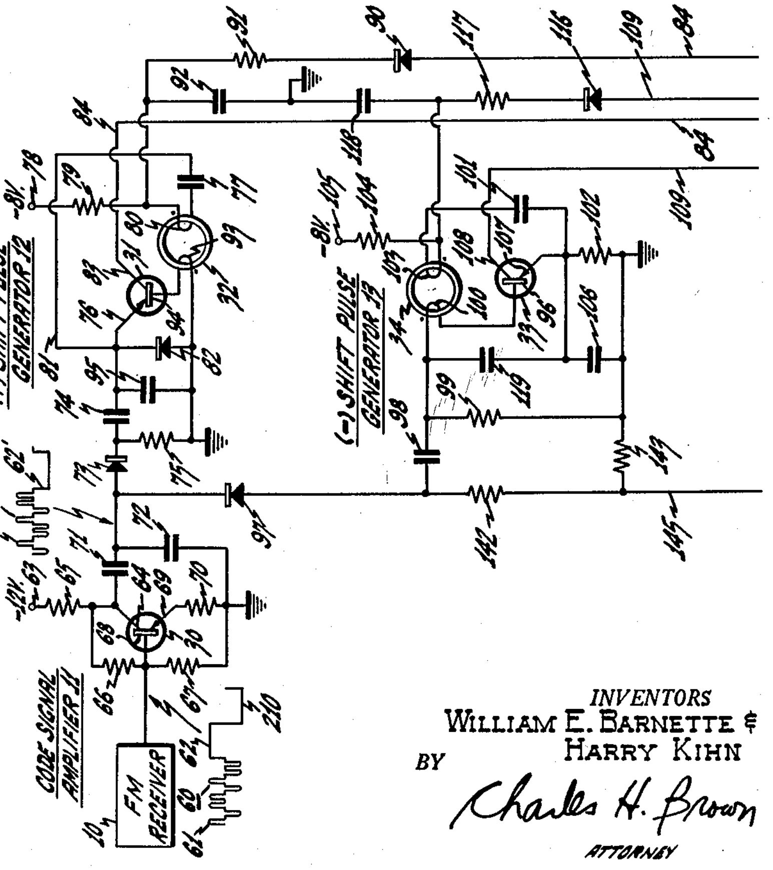
Figure 2B:
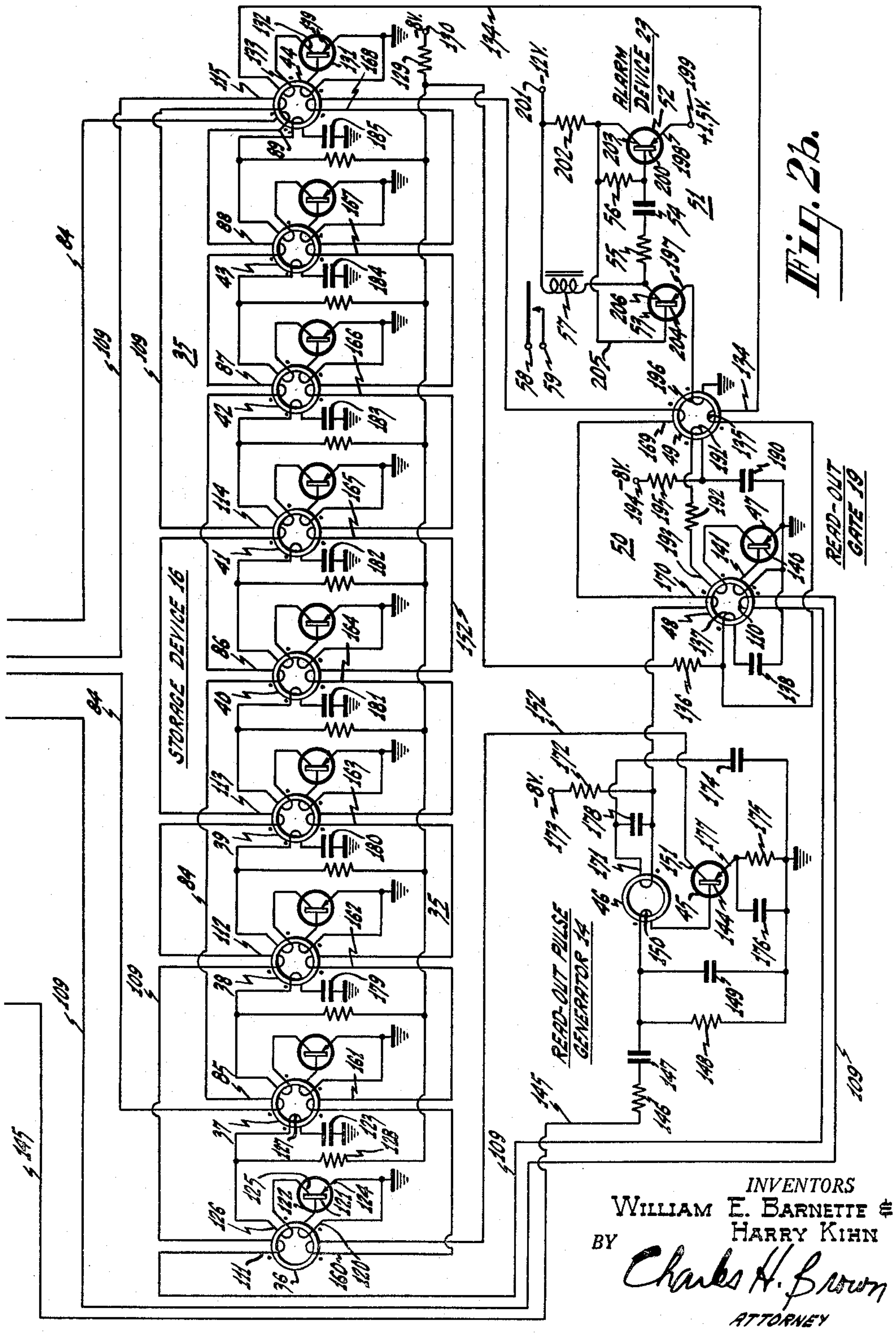

A more detailed description of the invention will now be given in connection with the accompanying drawing in which:

FIGURE 1 is a block diagram of one embodiment of the decoder circuit according to the invention; and FIGURE 2, FIGURES 2*a* and 2*b* taken together, is a circuit diagram given by way of example and arranged in the manner of the block diagram shown in FIGURE 1 according to the invention.

*Block Diagram of FIG. 1*

Referring to the block diagram given in FIGURE 1, an input signal, for example, in the form of a carrier upon which is frequency modulated a code signal including a predetermined number of serially appearing positive and negative half cycle sine wave pulses followed by a read-out or control pulse is fed to a receiver 10. The read-out pulse is of a time duration approximately equal to one-half the time duration of the series of half sine wave pulses but may be longer for increased safety or shorter for increased speed. In describing the invention, it will be assumed that the signal applied to the receiver 10 originates at a transmitting station which functions to transmit the signal over a radio channel using frequency modulation. The receiver 10 is of conventional design including the usual demodulation, mixer and intermediate frequency stages and functions to apply the incoming code signal to a code signal amplifier 11.

The invention is not to be considered as limited to the use thereof in a frequency modulation system as depicted in FIGURE 1. If a radio channel is used, the signal may be sent by the transmitting station using any of the known forms of transmission. For example, a carrier may be varied in phase or amplitude by the imposition upon it of the code signal, utilizing known transmitting and receiving equipment. In certain applications, the code signal may be applied directly to the code signal amplifier 11 in the decoder circuit of the invention over a conventional long line transmission system. Further, while the code signal is to be described as including a series of half sine wave pulses, the code signal may include a series of square, triangular, Gaussian or other type of pulses known in the art.

The receiver 10 in the example given includes the usual discriminating circuit for removing the incoming code signal from the received frequency modulated carrier wave by changing modulations in terms of frequency variation into amplitude variation. The resulting code signal is applied to the amplifier 11. The amplifier 11 is biased to provide amplification of both the positive and negative half sine wave pulses. The amplified code signal is fed from the amplifier 11 to a positive shift pulse generator 12, negative shift pulse generator 13 and to a read-out pulse generator 14. The positive shift pulse generator 12 and the negative shift pulse generator 13 are connected to a storage device 16 by connections represented as leads 17 and 18, respectively.

The storage device 16 preferably includes a transistorized magnetic core shift register constructed and operated in a manner to be described. The shift register includes a chain of magnetic cores equal in number to the number of half sine wave pulses plus the read-out pulse included in the incoming code signal. The shift register is of the type in which a storage function can be performed by causing the respective magnetic cores included therein to assume given electrical conditions, information in the form of a given electrical condition being advanced or shifted from magnetic core to magnetic core through the shift register by the selective application of shift current or trigger pulses to the magnetic cores. A reset circuit arrangement is provided so that a single electrical condition is stored in the first magnetic core of the chain in standby condition. The positive shift pulse generator 12 is connected to certain of the magnetic cores of the shift register in the storage device 16 and functions to trigger or shift the magnetic cores to which it is connected each time a positive pulse appears at the output of the amplifier 11 and is applied thereto. The negative shift pulse generator 13 is connected to the other or remaining magnetic cores of the shift register and functions to trigger the magnetic cores to which it is connected each time a negative pulse appears at the output of the amplifier 11 and is applied thereto.

The positive and negative shift pulse generators 12 and 13 are selectively connected to the magnetic cores of the shift register in the storage device 16 so that, when a code signal including a predetermined series arrangement of positive and negative half sine wave pulses is received, the single electrical condition originally stored in the first magnetic core is advanced upon the reception of each half sine wave pulse from one magnetic core to the next magnetic core in the shift register. When the predetermined series of half sine wave pulses is completely received, the single electrical condition is stored in the last magnetic core of the shift register. Depending upon the polarity of the read-out pulse in the incoming signal, following the series of half sine wave pulses, either the positive or negative shift pulse generator 12 or 13 is then operated upon the reception thereby of the read-out pulse to trigger the last magnetic core in the shift register. The single electrical condition is advanced out of the last magnetic core, and a current pulse is applied to a read-out gating circuit 19 over connections represented as lead 20.

The read-out pulse generator 14 is arranged to be non-responsive to the series of half sine wave pulses applied thereto from the amplifier 11. When the read-out pulse of the incoming signal is received, however, the read-out pulse generator 14 functions to apply a current pulse to the magnetic cores of the shift register in the storage device 16 over connections represented as lead 21 and to the read-out gating circuit 19 over connections represented as lead 22. The current pulse applied to the magnetic cores of the shift register over lead 21 causes the shift register to be reset to its original or starting condition in which the single electrical condition is stored in the first magnetic core of the shift register.

The read-out gating circuit 19 is responsive to the current pulse applied thereto over lead 20 and to the current pulse applied thereto over lead 22 to operate a control circuit or alarm device 23. The device 23 may be designed to perform any desired function. For example, the device 23 may be arranged to control the operation of other equipment in a desired manner as in telemetering and other remote control systems. For purposes of description, it will be assumed that the device 23 acts as an alarm circuit and includes a lamp and/or a sounding device.

If a code signal including a series of half sine wave pulses other than the predetermined series of half sine wave pulses is received by the decoder circuit, the single electrical condition will not be stored in the last magnetic core of the shift register in the storage device 16 at the time the following read-out pulse is received. As a result, a current pulse will not be applied to the read-out gating circuit 19 over lead 20 upon the reception by the decoder circuit of the read-out pulse. The read-out gating circuit 19 is responsive only to the reception thereby of both the current pulse from the storage device 16 over lead 20 and the current pulse from the read-out pulse generator 14 over lead 22. In the absence of the current pulse from the storage device 16, the read-out gating circuit 19 remains non-responsive to the current pulse applied thereto from the read-out pulse generator 14. The alarm device 23 remains inoperative, and no further action is performed by the decoder circuit.

By the operation described, the decoder circuit is only operated to energize the alarm device 23 in response to a correct code signal including the predetermined series of positive and negative half sine wave pulses. The decoder circuit, after detecting the reception of an incorrect code signal including a series of half sine wave pulses other than the predetermined series of half sine wave pulses performs no further action, and the alarm device 23 remains inoperative. Various safety features to be described are built into the decoder circuit according to the invention to ensure that the decoder circuit will bring about the operation of the alarm device 23 only in response to the correct code signal.

*Description of FIG. 2*

A circuit diagram of one embodiment of the invention according to the block diagram given in FIGURE 1 is given by way of example in FIGURE 2. The read-in circuit of the invention includes the amplifier stage 11, the positive shift pulse generator 12 and the negative shift pulse generator 13. The amplifier stage 11 includes a transistor 30. The transistor 30, as well as the other transistors included in the circuit diagram, are shown and will be described as P-N-P junction type transistors of N type conductivity. The transistors are of conventional design and each include a collector, emitter and base electrode. A transistor suitable for use is designated in the art as the 2N105 transistor. However, the invention is not limited to the use of this particular type of transistor. Transistors of P type conductivity may be used in the circuit in place of the transistors shown by changing the polarity of the voltage applied to the respective electrodes of the transistors in a manner understood in the art. The positive shift pulse generator 12 is a monocycle oscillator type trigger generator and includes a transistor 31 and a magnetic core 32. The negative shift pulse generator 13 is also a monocycle oscillator type trigger generator and includes a transistor 33 and a magnetic core 34.

The storage device 16 of the invention includes a shift register indicated generally by the reference numerals 35 and comprising a train or chain of magnetic cores 36 through 44. The magnetic cores 36 through 44 are arranged in a magnetic core shift register of the type generally referred to in the art as a single-core-per-bit shift register. A delay means including a transistor circuit is provided between succeeding magnetic cores in the train.

The read-out circuit of the invention includes a monocycle oscillator type trigger generator 14 defined as a read-out pulse generator comprising a transistor 45 and a magnetic core 46. In addition to the read-out pulse generator 14, the read-out circuit includes the read-out gate 19 and the alarm device or control circuit 23. The read-out gate 19 includes a monocycle oscillator type trigger generator 50 comprising a transistor 47 and a magnetic core 48. A magnetic core 49 is connected to the output of the generator 50. The alarm device 23 includes a transistor multivibrator 51 having a single stable state of operation. The multivibrator 51 includes a first transistor 52 which is normally conducting and a second transistor 53 which is normally cut-off. Upon the reception of an input pulse, transistor 53 becomes conducting and transistor 52 is cut-off. Following a time interval determined by the time constant of the circuit including capacitor 54 and resistors 55 and 56, the multivibrator 51 automatically returns to its single stable state in which transistor 52 is conducting and transistor 53 is cut-off. In other words, the reception of a single input pulse causes the multivibrator 51 to be triggered into an unstable state, the multivibrator 51 automatically returning after a predetermined delay to the single stable state. This type of multivibrator is generally referred to in the art as a monostable multivibrator. A winding 57 is included in the collector circuit of the transistor 53 and is arranged to be energized during the periods in which the multivibrator 51 is triggered into its unstable state. Each time the winding 57 is energized, a pair of contacts 58, 59 close, completing an electrical circuit for operating a sounder or other alarm device. A connection is completed between the transistor 53 and the magnetic core 49 for applying an input pulse to the multivibrator 51 in a manner to be described.

The size and weight of the decoder circuit of the invention is minimized by using magnetic cores and transistors to perform functions previously performed by other electrical equipment. The operation and construction of magnetic cores per se is known in the art and a detailed description thereof is unnecessary. A magnetic core is a circuit element having a substantially rectangular hysteresis loop of low coercive force. Certain materials such as molybdenum permalloy and manganese-magnesium ferrite exhibit a substantial rectangular hysteresis loop. A magnetic core is capable of being magnetized to saturation in either one of two directions. In one direction, a positive or active state is said to arise in which the direction of retentivity is opposite to that which would result from the application of a shift or trigger pulse to the magnetic core. In the second direction, a negative or inactive state is said to arise in which the direction of retentivity is the same as that which would result from the application of a shift pulse to the magnetic core. A magnetic core in the active or positive state is said to contain a "one," and a magnetic core in the negative or inactive state is said to contain a "zero." When a magnetic core is shifted from an active state to an inactive state, a voltage of one polarity is induced in an output winding on the core. A voltage of the opposite polarity is induced in an output winding on the core when the magnetic core is shifted from an inactive to an active state. The polarity of the voltage will in each case depend upon the direction in which the output winding is wound on the core, and so on. To aid in an understanding of the invention, a dot has been placed adjacent the windings on the various magnetic cores of the decoder circuit following conventional transformer practice to indicate the positive input to the respective windings on each of the magnetic cores.

In the operation of the decoder circuit of the invention, a frequency modulated carrier is applied to the receiver 10. The receiver 10 functions to remove the incoming code signal from the frequency modulated carrier wave by changing modulations in terms of frequency variation into amplitude variation. An example of a code signal 60 appearing at the output of the receiver 10 is given in FIGURE 2. The code signal 60 includes a series of positive and negative half sine wave pulses 61. While a series of eight such pulses 61 is shown, the number may be varied in different applications as will become apparent from the description. The positive and negative pulses are arranged in a given order of appearance so as to form a predetermined code signal. A read-out pulse 62 follows the series of half sine wave pulses 61 and is of a duration approximately equal to one-half the time duration of the series of pulses 61. The read-out pulse 62 is made of sufficient duration to permit the completion of the read-out functions by the decoder circuit.

On the start-up of operation, an on-off switch, not shown, may be closed so that a negative voltage is applied from the negative terminal 63 of a source of unidirectional potential, not shown, to the collector electrode 64 of the transistor 30 over an electrical path including resistor 65. A negative bias is developed across a voltage dividing network including resistors 66, 67 and applied to the base electrode 68 of the transistor 30. The emitter electrode 69 of the transistor 30 is connected to ground over an electrical path including resistor 70. The term ground, as used in the specification, is to be understood as referring to a point of fixed reference potential. The emitter electrode 69 is positive with respect to the base electrode 68, while the collector electrode 64 is negative with respect to the base electrode 68. The transistor 30 becomes and remains conducting. By connecting one end of the resistor 66 between the resistor 65 and the collector electrode 64, a feedback is provided from the collector electrode 64 for D.C. (direct current) stability. While a specific voltage value is indicated at the negative terminal 63 and at the other voltage terminals shown in FIGURE 2, the values are given only by way of example and can be altered in a known manner to meet the requirements of a particular application.

The received code signal 60 is applied from the receiver 10 to the base electrode 68 of the transistor 30. The transistor 30 is biased to provide amplification of both the positive and negative signal pulses 61 included in the code signal 60 with positive and negative saturation occurring at about the same input level. The reception of each positive pulse causes the transistor 30 to approach cut-off such that a negative pulse is produced in the collector circuit thereof, while the reception of each negative pulse causes the transistor 30 to conduct more heavily such that a positive pulse is produced in the collector circuit thereof. In this manner, the respective pulses 61 and 62 included in the code signal 60 are each amplified and reversed in polarity by the operation of the transistor amplifier 30. The reversed nature of the code signal 60 at the output of the amplifier stage 11 is shown in FIGURE 2 by the waveform 60′ which depicts the polarity change of the pulses 61 and read-out pulse 62.

The code signal appearing in the collector circuit of the transistor 30 is applied from the amplifier stage 11 to the positive and negative shift pulse generators 12, 13 over an electrical path including a coupling circuit comprising capacitor 71 and a capacitor 72 connected to ground. A unidirectional current conducting device shown as a rectifier 73 is connected in series with the input to the positive shift pulse generator 12. For the sake of description, various other unidirectional current conducting devices located elsewhere in the circuit diagram have also been shown as rectifiers, for example, of the type designated in the art by the reference 1N192. It is to be understood, however, that other known devices designed to pass current in only one direction may be used in place of the rectifiers shown. The rectifier 73 is poled in the proper direction so that only the positive half sine wave signal pulses 61′ included in the incoming code signal 60′ are developed across a resistor 75 for application to the positive shift pulse generator 12. The positive pulses are differentiated by the series capacitor 74 and the low input resistance of the emitter fed transistor 31. A differentiated positive pulse applied to the emitter electrode 76 of the transistor 31 causes the transistor 31 to conduct. A capacitor 77 is normally charged negatively over an electrical path including the negative terminal 78 of a source of unidirectional potential, not shown, resistor 79, a forty turn winding 80 on the magnetic core 32, a lead 81, and a rectifier 82. For the sake of description, reference will be made to the number of turns in the various windings on the respective ferrite magnetic core used in a decoder circuit which has been constructed according to the circuit diagram given in FIGURE 2. The number of turns indicated in each case, however, is given only by way of example and may be changed to meet the requirements of a particular application.

When the transistor 31 becomes conducting, the capacitor 77 discharges. Current flows over an electrical path including collector electrode 83, lead 84, a five turn shift winding 85 on the magnetic core 37, a five turn shift winding 86 on the magnetic core 40, a five turn shift winding 87 on the magnetic core 42, a five turn shift winding 88 on the magnetic core 43, a five turn shift winding 89 on the magnetic core 44, a rectifier 90, resistor 91, capacitor 92 connected to ground, the winding 80 on the magnetic core 32, capacitor 77, lead 81 and the emitter electrode 76 of the transistor 31. The magnetic core 32 is normally set in a "one" or active state. The current flow in the winding 80 is in the proper polarity according to the direction in which the winding 80 is wound thereon to start a shifting of the magnetic core 32 from a "one" state into a "zero" or inactive state. A negative voltage is induced in an eighty turn winding 93 on the magnetic core 32 included in the base circuit of the transistor 31, driving the base electrode 94 of the transistor 31 more negative. As a result of this regenerative action, the transistor 31 conducts more heavily. The increased current flows causes the magnetic core 32 to complete its shift into the "zero" state. Following the discharge of the capacitor 77 and the shifting of the magnetic core 32 from a "one" into a "zero" state, the feedback to the transistor 31 drops to zero because the coupling between the windings 80, 93 on the magnetic core 32 drops essentially to zero. The transistor 31 ceases to conduct, and capacitor 77 again charges over the circuit outlined above. The resulting current flow in the opposite direction causes the magnetic core 32 to be reset to a "one" state. The positive shift pulse generator 12 is ready to operate upon the reception of the next positive signal pulse 61′ included in the incoming code signal 60′.

A capacitor 95 is connected in parallel with the rectifier 82 shunting the emitter electrode 76 input. The capacitor 95 charges negatively when the positive shift pulse generator 12 is triggered. This negative charge biases off the emitter electrode 76 immediately after the triggering of the transistor 31 so that the transistor 31 can not be triggered again until the capacitor 95 has discharged through the rectifier 82 to a sufficiently low level. The value of the capacitor 95 is determined so as to prevent the retriggering of the transistor 31 by the same received positive pulse 61′. At the same time, the value of the capacitor 95 is determined so that the capacitor 95 will be discharged by the time the next pulse 61′ included in the incoming code signal is received, permitting the triggering of the transistor 31 if the next pulse is positive in nature. The parallel connected rectifier 82 cuts the discharge time of the capacitor 95 to a low enough value to accommodate a desired code rate. It has been found that a code rate up to approximately 1500 cycles per second can be accommodated. Since the rectifier 82 only conducts in the negative direction, it does not load the positive signal pulses 61′ applied to the emitter electrode 76.

The triggering of the positive shift pulse generator 12 in the manner described produces a very sharp positive going trigger pulse, for example, of three microseconds duration, in the collector circuit of the transistor 31. The shift windings 85 through 89 are wound on the respective magnetic cores 37, 40, 42, 43, and 44 in a direction such that the positive going trigger pulse applied thereto from the positive shift pulse generator 12 causes each of the respective magnetic cores 37, 40, 42, 43 and 44 to remain in a "zero" state or, if in a "one" state at the time of the trigger pulse, to be shifted into a "zero" state.

In addition to being applied to the positive shift pulse generator 12 via rectifier 73, the half sine wave pulses 61′ are applied to the base electrode 96 of the transistor 33 in the negative shift pulse generator 13 over an electrical path including a rectifier 97, capacitor 98, resistor 99 connected to ground and an eighty turn winding 100 on the magnetic core 34. The rectifier 97 is poled in the proper direction to pass only the negative code signal pulses 61′ included in the incoming code signal 60′. The negative pulses 61′ are differentiated by the series capacitor 98 and resistor 99 in shunt with the base input of the transistor 33. The application of the negative voltage to the base electrode 96 upon the reception of each negative signal pulse 61′ causes transistor 33 to conduct.

A capacitor 101 is normally charged negatively over an electrical path including resistor 102, a forty turn winding 103 on the magnetic core 34, a resistor 104 and the negative terminal 105 of a source of unidirectional potential. A capacitor 106 is connected across the resistor 102, the combination of the capacitor 106-resistor 102 serving to control the potential on the emitter electrode 107 to provide temperature stability in the operation of the transistor 33. When transistor 33 conducts, capacitor 101 is discharged and current flows over an electrical path including the collector electrode 108, lead 109, the shift winding 110 on the magnetic core 48 in the read-out gate 19, the shift windings 111 through 115 on the respective magnetic cores 36, 38, 39, 41 and 44 in the shift register 35, rectifier 116, resistor 117, capacitor 118 connected to ground, winding 103 on magnetic core 34, capacitor 101 and emitter electrode 107. The magnetic core 34 is normally in a "one" state. The current flow in the winding 103 causes the magnetic core 34 to start to shift into a "zero" state. A negative voltage is induced in the winding 100, biasing the base electrode 96 more negative. Transistor 33 conducts more heavily and the increased current flow resulting from the regenerating action causes the magnetic core 34 to complete its shift into a "zero" state. When the magnetic core 34 becomes saturated in the "zero" state thereof, the coupling through the magnetic core 34 drops essentially to zero and the transistor 33 is cut-off. Capacitor 101 recharges over the charging path described. Since the current flow through winding 103 is now in the opposite direction, the magnetic core 34 is reset to a "one" state. The negative shift pulse generator 13 operates in response to each negative pulse 61′ applied thereto from the amplifier 11 to apply a sharp positive pulse, for example, of three microseconds duration, to the trigger or shift windings 110 through 115 on the magnetic cores 48, 36, 38, 39, 41 and 44, respectively. The winding 110, and five turn windings 111 through 115 are wound on the respective magnetic cores 48, 36, 38, 39, 41 and 44, respectively, in a direction such that upon the application of each trigger pulse thereto from the negative shift pulse generator 13 the magnetic cores 48, 36, 38, 39, 41 and 44 will each remain in a "zero" state or, if in a "one" state at the time of the trigger pulse, will be shifted into a "zero" state.

A capacitor 119 in the base circuit of transistor 33 is charged positively during the triggering of the shift pulse generator 13 by the voltage across the winding 100. After the negative shift pulse generator 13 has triggered, capacitor 119 discharges through the resistor 99 in shunt therewith. The base electrode 96 is biased positive, preventing the accidental triggering of the negative shift pulse generator 13. The value of the capacitor 119 and resistor 99 is set so that the capacitor 119 will be discharged by the time a next code signal pulse 61′ is received such that the negative shift pulse generator 13 will be triggered in response to the signal pulse if it is negative in nature. In this connection, the capacitor 106 upon the triggering of the generator 13 will charge negatively. Since the emitter electrode 107 is biased negatively by the charge on the capacitor 106, this condition further serves to prevent the retriggering of the generator 13 in response to the same input signal pulse. Capacitor 106 discharges through resistor 102 in sufficient time to permit the triggering of the generator 13 in response to the next received signal pulse if the signal pulse is negative.

The operation of the storage device 16 including shift register 35 will now be described. Various types of magnetic core shift registers are known. Such shift registers include a number of magnetic cores arranged in a train, each of the magnetic cores having at least an input, output and shift winding mounted thereon. The output winding on each one of the magnetic cores is connected to the input winding on the next magnetic core in the train. The shift windings are usually connected in series relationship to a suitable source of shift current or trigger pulses. In the operation of the shift register, the first magnetic core in the train is made to assume a "one" state. Thereafter, a shift pulse is applied to the shift windings on all of the magnetic cores in the train. This action causes the "one" to be read-out of the first magnetic core and into the next or second magnetic core in the train. That is to say, the first magnetic core shifts into a "zero" state, while the second magnetic core is made to shift into a "one" state. A current flow through the output winding on the first magnetic core results in a current flow through the input winding on the second magnetic core in a given direction to cause the second magnetic core to shift into a "one" state. It is essential that the current flow through the input winding on the second magnetic core in the given direction occur after the shift pulse has been applied thereto. The simultaneous application of the shift pulse to the shift winding and of the input pulse to the input winding on the second magnetic core would result in a cancellation of the pulses, causing the second magnetic core to remain in its present state. Delay means are, therefore, provided in the connection between the first and second magnetic cores to delay the application of the input pulse to the second magnetic core until after the shift pulse has been applied to the shift windings on the magnetic cores in the train. Similar delay means are provided between each succeeding pair of magnetic cores in the train. As additional shift pulses are applied to the shift windings on the magnetic cores in the train, the "one" stored in the second core is made to advance core-by-core along the train of magnetic cores. In this manner, information can be fed into and stored in the shift register.

In one type of magnetic core shift register, a magnetic core is included in the connection between succeeding magnetic cores in the train to perform the delay function referred to above. This type of shift register is generally referred to in the art as a two-core-per-bit shift register. The use of the additional magnetic cores in the shift register, however, limits the speed of operation and involves the use of additional circuits and equipment, creating problems of power supply, and so on. Magnetic core shift registers are also available which involve the use of RC (resistance-capacitance) delay networks and biasing networks using diodes to perform the delay and advance functions. In designing the decoder circuit of the invention, it was necessary to give attention to the number and size of components required in the construction and operation of the magnetic core shift register 35 of the storage device 16. A magnetic core shift register is disclosed by the invention which is capable of low average power operation and offers definite advantages in its operational characteristics such as speed of operation, number and size of components required, and so on.

In the operation of the shift register 35, means to be described are provided for causing the first magnetic core 36 to be in a "one" state and the remaining magnetic cores 37 through 44 to be in a "zero" state during standby operation. It will be assumed for the moment that the first pulse 61′ of an incoming code signal available at the output of the amplifier 11 is negative. The negative shift pulse generator 13 operates in response to the pulse 61′ to apply a trigger pulse over lead 109 to the winding 111 on the magnetic core 36. The magnetic core 36 starts to shift into a "zero" state. A negative voltage is induced in a twenty turn winding 120 biasing the base electrode 121 of a transistor 122 negative. Transistor 122 becomes conducting. A capacitor 123 is normally charged over a path to be described. When transistor 122 conducts, capacitor 123 discharges. Current flows over an electrical path including emitter electrode 124, collector electrode 125, a twenty turn winding 126 on the magnetic core 36, a twenty turn input winding 127 on the magnetic core 37, capacitor 123 and a ground return. The current flow through the winding 126 results, due to the direction in which the winding 126 is wound on the magnetic core 36, in an increase in the negative bias applied to the base electrode 121 by the voltage induced in the winding 120. Transistor 122 is made to conduct more heavily. As a result of this regenerative action, the magnetic core 36 is shifted into the "zero" state. The current pulse in the winding 127 during the period in which capacitor 123 is discharging is in view of the direction in which the winding 127 is wound on the magnetic core 37 such as to cause the magnetc core 37 to shift into a "zero" state. Since the magnetic core 37 is already in a "zero" state, no action will occur.

When the magnetic core 36 is saturated in a negative direction or, in other words, a "zero" is stored therein, the transistor 122 ceases conducting since the base electrode 121 is no longer biased negative. When the transistor 122 ceases conducting, capacitor 123 charges over an electrical path including winding 127 on the magnetic core 37, resistor 128, resistor 129, and the negative terminal 130 of a source of unidirectional potential. The current pulse applied to the winding 127 causes the magnetic core 37 to shift from a "zero" state into a "one" state. In this manner, therefore, the "one" is read-out of the magnetic core 36 and is read into the magnetic core 37, the transistor 122-capacitor 123 circuit providing the necessary delay. If the next signal pulse included in the incoming code signal should be positive in nature, the positive shift pulse generator 12 will function to apply a shift pulse to the shift winding 85 on the magnetic core 37 over lead 84. The "one" stored in the magnetic core 37 will be read out of the magnetic core 37 and will be read into the magnetic core 38 following the circuit operations described, and so on. Each of the magnetic cores in the shift register 35 are connected to the succeeding magnetic core through a coupling circuit as described in connection with the magnetic cores 36, 37.

*Operation of FIG. 2*

So as to describe the actual operation of the invention, the decoder circuit given in FIGURE 2 has been designed to bring about the operation of the alarm device 23 in response to the code signal 60 given by way of example in the drawing. As mentioned above, the shift register 35 is, in standby operation, in a condition in which the first magnetic core 36 is in a "one" state and the remaining magnetic cores 37 through 44 are in a "zero" state. The incoming code signal 60 is processed by the amplifier stage 11 and appears as the code signal 60′ at the output thereof. As shown, the first, third, fourth and sixth pulses 61′ are negative, while the second, fifth, seventh and eighth pulses 61′ are positive. The negative shift register 13 responds to the first pulse 61′ to apply a trigger pulse to winding 111 on magnetic core 36 over lead 109, and the "one" state is advanced out of the magnetic core 36 and into the next magnetic core 37. The positive shift pulse generator 12 responds to the second pulse 61′ to apply a trigger pulse to winding 85 on magnetic core 37, and the "one" state is advanced out of magnetic core 37 and into magnetic core 38. The third and fourth pulses 61′ are negative, and the negative shift pulse generator 13 by applying trigger pulses over lead 109 causes the "one" state to be first advanced out of magnetic core 38 and into magnetic core 39 and then to be advanced out of magnetic core 39 and into magnetic core 40.

The fifth pulse 61′ is positive, and the positive shift pulse generator 12 causes by applying a trigger pulse over lead 84 the "one" state to be advanced out of the magnetic core 40 and into the magnetic core 41. The sixth pulse 61′ is negative, and the trigger pulse applied over lead 109 by the negative shift pulse generator 13 causes the "one" state to be advanced out of the magnetic core 41 and into the magnetic core 42. The seventh and eighth pulses 61′ are positive, and the positive shift pulse generator 12 causes the "one" state to be first advanced out of the magnetic core 42 and into the magnetic core 43 and then to be advanced out of the magnetic core 43 and into the magnetic core 44. Therefore, upon the reception of the series of half sine wave pulses 61′, the "one" state will have been advanced through the shift register 35 and is stored in the last magnetic core 44.

Following the reception of the series of half sine wave pulses 61′, the read-out pulse 62′ is received. Since the read-out pulse 62′ is negative, the read-out pulse 62′ is applied via rectifier 97 to the negative shift pulse generator 13. The negative shift pulse generator 13 is triggered in response to the leading edge of the read-out pulse 62′ and applies a trigger pulse over lead 109. The application of the trigger pulse over lead 109 to the shift winding 110 on the magnetic core 48 in the read-out gate 19 ensures that the magnetic core 48 is in a "zero" state at this time. The trigger pulse is also applied over lead 109 to the shift winding 115 on the magnetic core 44 in the shift register 35. The magnetic core 44 starts to shift into the "zero" state thereof, and transistor 131 starts to conduct. The collector electrode 132 of transistor 131 is connected in an electrical path including the winding 133 on the magnetic core 44, lead 134, a five turn winding 135 on the magnetic core 49, resistor 136 and resistor 129 connected to the negative terminal 130, a winding 137 on magnetic core 48, capacitor 138, ground return and the emitter electrode 139 of transistor 131.

When the transistor 131 conducts, capacitor 138 which is normally charged from terminal 130 discharges and current flows over the electrical path just described. Winding 135 is wound in the proper direction on the magnetic core 49 so that the voltage induced therein causes the magnetic core 49 to shift into a "one" state. When the magnetic core 44 has shifted into a "zero" state, transistor 131 ceases conducting. Capacitor 138 recharges over the electrical path including negative terminal 130, resistors 129, 136 and winding 137. The voltage induced in the winding 137 causes the magnetic core 48 to shift into a "one" state. Since a positive voltage is applied to the base electrode 140 of transistor 47 via the winding 141 at this time, transistor 47 remains non-conducting. The reception of the leading edge of the read-out pulse 62′ by the decoder circuit, therefore, results in the last magnetic core 44 of the shift register 35 being shifted into a "zero" state and in the magnetic cores 48, 49 of the read-out gate 19 each assuming a "one" state. Since the read-out pulse 62′ appears at the negative shift pulse generator 13 due to the differentiation thereof only as a relatively narrow pulse similar to the signal pulses 61′, the negative shift pulse generator 13 is prevented from retriggering during the time of the read-out pulse 62′. The circuit arrangement including capacitors 119 and 106 functions as described to prevent the negative shift pulse generator 13 from retriggering in response to the narrow pulse produced by the differentiation of the read-out pulse 62′.

As the read-out pulse 62′ is applied to the negative shift pulse generator 13, it appears across a resistive dividing network including resistors 142 and 143. The negative pulse is applied from the junction of resistors 142, 143 to the base electrode 144 of the transistor 45 in the read-out pulse generaor 14 over an electrcal path including lead 145, resistor 146, capacitor 147, resistor 148 connected to ground capacitor 149 connected to ground and a one hundred and twenty turn winding 150 on the magnetic core 46 in the read-out pulse generator 14. It is evident that the negative signal pulses 61′ applied to the negative shift pulse generator 13 are also applied from the junction of the resistors 142, 143 to the base electrode 144 over the electrical path just described. The resistive network including resistors 142, 143, the series connected resistor 146 and the parallel connected resistor 148 and capacitor 149 forms an integrating circuit. Capacitor 147 functions as a coupling capacitor. The values of the resistors 142, 143, 146, 148 and capacitor 149 are chosen so as to discriminate against the half sine wave pulses 61′ applied thereto. The sensitivity of the read-out pulse generator 14 during the read-in period of the cycle of operation is reduced sufficiently to prevent the operation thereof in response to the signal pulses 61'.

The read-out pulse 62' is of a width and amplitude such that a negative voltage is produced in the integrating arrangement in the base input sufficient to bias the base electrode 144 negatively. Transistor 45 becomes conducting. The collector electrode 151 of the transistor 45 is included in an electrical path including a lead 152, the five turn reset windings 160 through 168 on the magnetic cores 36 through 44, respectively, in the shift register 35, a one turn winding 169 on the magnetic core 49, shift winding 170 on the magnetic core 48, a sixty turn winding 171 on the magnetic core 46, a resistor 172 connected to the negative terminal 173 of a source of unidirectional potential, capacitor 174, ground return, resistor 175 across which is connected a capacitor 176 and the emitter electrode 177 of the transistor 45. When transistor 45 conducts, capacitor 174 normally charged from the negative terminal 173 discharges. A reset current pulse is applied to the reset windings 160 through 168 on the respective magnetic cores 36 through 44. The windings 161 through 168 are each wound on the respective magnetic cores 37 through 44 in a direction to cause, upon the application thereto of the reset current pulse, each of the magnetic cores 37 through 44 to remain in a "zero" state or to assume a "zero" state if in a "one" state at the time of the reset current pulse. The reset winding 160 is wound on the magnetic core 36 in a direction such that the application of the reset current pulse thereto results in the magnetic core 36 either remaining in or being shifted into a "one" state. The shift register 35 is in this manner reset at the time of the read-out pulse 62' to its original starting or standby condition in which a "one" is stored in the first magnetic core 36, the remaining magnetic cores 37 through 44 of the shift register 35 being in a "zero" state.

When the magnetic core 46 which is normally in a "one" state has been shifted into a "zero" state by the regenerative action already described, the transistor 45 ceases conducting and capacitor 174 recharges from the negative terminal 173 through the winding 171. The current flow through the winding 171 causes the magnetic core 46 to be shifted out of the "zero" state and into the original or "one" state thereof. During the operation of the read-out generator 14, capacitor 176 is charged negatively, while the capacitor 149 is charged positively. When transistor 45 ceases conducting, the negative bias supplied to the emitter electrode 177 from the capacitor 176 and the positive bias supplied to the base electrode 144 from the capacitor 149 prevents the read-out pulse generator 14 from retriggering in response to the read-out pulse 62'. By the operation described, the read-out pulse generator 14 would normally produce a sharp current pulse. However, a capacitor 178 is connected across the winding 171 and is of a value such that the capacitance plus the relatively large inductance of winding 171 produces a reset current pulse which is of a relatively long duration, for example, of twenty-five to thirty microseconds with a rise time of four microseconds. The duration of the reset current pulse is determined so that any one or more of the capacitors 123, 179 through 185 and 138 discharged as a result of the shifting in state of the magnetic core to which it is connected is recharged prior to the end of the reset current pulse. Since the current flow through the reset winding on each one of the magnetic cores 37 through 44 effectively cancels a current flow through the input winding on one of the magnetic cores by the recharging of the capacitor connected in the input thereof, this operation removes the possibility that one or more of the magnetic cores 37 through 44 in the shift register 35 might be shifted into a "one" state by the recharging of the capacitor in the input thereof after the end of the reset current pulse. Such action would establish an erroneous condition in the shift register 35 and could prevent the proper operation of the decoder circuit in response to the next code signal received.

In addition to being applied to the reset windings 160 through 168, the reset current pulse is also applied in the manner already described over lead 152 to the one turn winding 169 on the magnetic core 49 and to the shift winding 170 on the magnetic core 48 of the read-out gate 19. The winding 170 is wound on the magnetic core 48 in a direction such that the current flow through the winding 170 causes the magnetic core 48 to start to shift from a "one" state to a "zero" state. It will be remembered that the magnetic cores 48, 49 are both in a "one" state at this time due to the previous application thereto of a current pulse as a result of the shifting in state of the last magnetic core 44 in shift register 35. As the magnetic core 48 starts to change state, the transistor 47 conducts and capacitor 190 discharges over the electrical path including the three turn input winding 191 on magnetic core 49, resistor 192 and the winding 193 on the magnetic core 48. Following the total change in state of the magnetic core 48, transistor 47 ceases conducting and capacitor 190 recharges from the negative terminal 194 of a source unidirectional potential through resistor 195.

The magnetic core 49 is constructed of a material having a substantially square hysteresis curve and a large coercive force threshold. The winding 169 and the winding 191 are wound on the magnetic core 49 in a direction such that the current flow through the winding 191 resulting from the discharge of capacitor 190 and conduction of transistor 47 at the triggering of the magnetic core 48-transistor 47 circuit adds to the current flow through the winding 169 as a result of the application thereto of the reset current pulse. The magnetic core 49 in response to the simultaneous application of current pulses to windings 169, 191 shifts from the "one" state to a "zero" state, and a positive output pulse is produced in the thirty turn output winding 196 on the magnetic core 49. A feature of the invention is the fact that the magnetic core 49 only changes state in response to the simultaneous application in the manner described of a current pulse to the winding 191 and of a current pulse to the winding 169. The application of a current pulse to one of the windings 169 or 191 without the simultaneous application of a current pulse in the manner described to the other winding is insufficient to change the state of the magnetic core 49. Upon the magnetic core 49 changing from the "one" to "zero" state thereof, the positive output pulse so produced is applied from the winding 196 to the emitter electrode 197 of the transistor 53 in the multivibrator 51 of the alarm device 23.

The multivibrator 51 includes two transistors 52, 53. The emitter electrode 198 of the transistor 52 is connected to the positive terminal 199 of a source of unidirectional potential. A negative biasing voltage is applied to the base electrode 200 of the transistor 52 over an electrical path including the negative terminal 201 of a source of unidirectional potential, resistor 202 and resistor 56. Transistor 52 is normally conducting and current flows over an electrical path including emitter electrode 198, collector electrode 203, resistor 202 and terminal 201. The positive going voltage appearing in the collector circuit of transistor 52 is used to bias the base electrode 204 of transistor 53 positive over a lead 205 such that transistor 53 is normally cut-off. The capacitor 54 is normally charged negatively at a potential equal to the difference between the potential of the collector electrode 206 and the base electrode 200. When the magnetic core 49 is shifted into the "zero" state, the positive voltage applied to the emitter electrode 197 causes the transistor 53 to start conducting. Current flows over an electrical path including emitter electrode 197, collector electrode 206 and a winding 57. Capacitor 54 discharges, and a positive going voltage is applied to the base electrode 200.

Transistor 52 becomes non-conducting. The negative going voltage appearing in the collector circuit of transistor 52 and applied to the base electrode 204 over lead 205 causes transistor 53 to conduct more heavily. Following a time period determined by the value of the capacitor 54 and resistors 55 and 56, the capacitor 54 discharges to a level such that the voltage applied to the base electrode 200 is sufficiently less positive with respect to the voltage applied to the emitter electrode 198 from the terminal 199 to cause the transistor 52 to conduct. The positive going voltage appearing in the collector circuit of the transistor 52 and applied to the base electrode 204 of the transistor 53 causes the transistor 53 to cease conducting. The capacitor 54 recharges in the polarity indicated above. As a result of this action, the monostable multivibrator 51 is reset in its single stable state in which transistor 52 is conducting and transistor 53 is cutoff. Resistor 55 and the shunt capacity to ground of the base circuit of transistor 52 serve to prevent sustained oscillations when the large inductance of winding 57 is in the circuit.

During the period in which transistor 53 is conducting, the winding 57 included in the alarm device 23 is energized and contacts 58, 59 are closed. The contacts 58, 59 are included in an electromagnetically operated switching circuit. The switching circuit functions to operate some type of alarm such as a light and/or a sounding device, indicating that the code signal assigned to the decoder circuit has been received.

In review, when a correct code signal 60 assigned to the decoder circuit as shown in FIGURE 2 is received, the last magnetic core 44 in the shift register 35 is, following the reception of the half sine wave pulses 61, in a "one" state. The reception of the read-out pulse 62 thereafter results in the simultaneous application of a current pulse to the winding 169 and of a current pulse to the winding 191 on the magnetic core 49. The magnetic core 49 is made to shift in state, producing a large output pulse for application to the alarm device. The alarm device 23 is responsive to the output pulse to operate suitable alarm or other apparatus, indicating the reception of the correct code signal.

When a wrong code signal or, in other words, all code signals including a series of half sine wave pulses arranged in an order different than that of the pulses 61 given in FIGURE 2 is received, the "one" state originally stored in the first magnetic core 36 of the shift register 35 will not have reached the last magnetic core 44 at the time of the following read-out pulse. This is true since the magnetic cores 36 through 43 will not be triggered in the order and according to the manner in which they are connected to the positive and negative shift pulse generators 12, 13. As only a single "one" state is stored in the shift register 35 during the decoding or read-in operation, the predetermined or correct series of half sine wave pulses must be received to cause the "one" state to be stored in the last magnetic core 44 at the time of the read-out pulse. When a wrong series of half sine wave pulses is received, there will be no triggering of the last magnetic core 44 by the negative shift pulse generator 13 in response to the leading edge of the received read-out pulse, and the magnetic cores 48, 49 remain in a "zero" state. Since the magnetic core 48 remains in a "zero" state, the magnetic core 48-transistor 47 circuit is not triggered in response to the application of the reset current pulse to winding 170 thereof from the read-out pulse generator 14 over lead 152 in response to the reception by the decoder circuit of the read-out pulse. There is a negligible input to the winding 191 on the magnetic core 49. The magnetic core 49 is in a "zero" state, and is, therefore, non-responsive to the reset current pulse applied to winding 169 from the read-out pulse generator 14. No output pulse is applied to the multivibrator 51, and the alarm device 23 remains inoperative. Even though the magnetic core 49 may be in a "one" state due to various circuit operations at the time the reset current pulse is applied to the winding 169 thereon, the magnetic core 49 is not shifted and remains in a "one" state. This is true since the simultaneous application of a current pulse to both the windings 169 and 191 is required to shift the magnetic core 49 to a "zero" state. As a current pulse is not applied to the winding 191 at the time that the reset current pulse is applied to the winding 169, the magnetic core 49 remains in a "one" state and the alarm device 23 remains inoperative.

Under conditions of noise and/or interference, the "one" state may reach the magnetic core 44 and be advanced out of the magnetic core 44 to cause the magnetic cores 48, 49 to each assume a "one" state prior to the end of the series of half sine wave pulses included in an incoming code signal. In this situation, the trigger pulse produced by the negative shift pulse generator 13 in response to the leading edge of the following read-out pulse and applied to the winding 110 over lead 109 causes the magnetic core 48 to shift into a "zero" state. The triggering of the transistor 47-magnetic core 48 circuit results in a current pulse being applied to the winding 191 on the magnetic core 49. Since the reset current pulse is not applied to the winding 169 until after the trigger pulse is applied to the winding 110 of magnetic core 48 due to the integration of the read-out pulse performed in the read-out pulse generator 14, the magnetic core 49 remains in a "one" state and no operation of the alarm device 23 occurs. The above action results in the magnetic core 48 being in a "zero" state and the magnetic core 49 being in a "one" state. When the reset current pulse is produced by the read-out generator 14 and applied over lead 152 to the windings 169 and 170, the magnetic core 48 already in a "zero" state remains in a "zero" state. There is a negligible input to the winding 191 on the magnetic core 49. The magnetic core 49 remains in a "one" state in response to the reset current pulse applied to the winding 169 and the alarm device 23 continues to be inoperative.

A feature of the invention is the fact that it is impossible for the alarm device 23 to be operated accidentally or otherwise during the read-in portion of the operating cycle of the decoder circuit. During the read-in portion of the operating cycle, the magnetic cores 48, 49 can not be operated to bring about the operation of the alarm device 23. There is either a negligible input to the winding 191 or a zero input to the winding 169 at all times during the read-in period, resulting in a zero output from the winding 196 to the alarm device 23. The alarm device 23 remains inoperative. By the circuit operation described, the decoder circuit of the invention is made to operate the alarm device 23 only upon the reception of the predetermined code signal. The alarm device 23 remains inoperative upon the reception by the decoder circuit of any code signal other than the predetermined code signal.

In the construction of the decoder circuit as shown in FIGURE 2, the last magnetic core 44 has mounted thereon a winding 115 connected over trigger lead 109 to the negative shift pulse generator 13 and a winding 89 connected over trigger lead 84 to the positive shift pulse generator 12. This arrangement serves to ensure a high probability of correct code reception. Since the last magnetic core 44 is fed by both the positive and negative trigger lines 84, 109, any undesired "one" states present in the shift register 35 as by noise or interference and advanced into the magnetic core 44 are shifted out of the shift register 35 prior to read-out operation. Either a positive or a negative half sine wave pulse will clear the magnetic core 44, preventing the improper shifting of the magnetic core 44 at the time of the trigger pulse applied to the magnetic core 44 from the negative shift pulse generator 13 in response to the leading edge of the read-out pulse.

The arrangement including rectifiers 90 and 116, resistors 91 and 117 and capacitors 92 and 118 constitute a filter circuit. While the filter circuit so provided is not essential to the operation of the invention, the filter circuit provides an additional safety feature by isolating the trigger leads 84 and 109 from one another. The leads 84 and 109 may unavoidably be positioned sufficiently close to one another in packaging such that a trigger pulse applied over one lead is capacitively coupled to the other lead. Such action could cause the improper triggering of the shift register 35 such that the real make-up of the incoming code signal is disguised. The filter circuit indicated serves to isolate the leads 84 and 109 and prevents this occurrence.

In practice, a number of decoder circuits constructed according to the invention can be designed to each operate an alarm device only in response to a predetermined code signal, each code signal including the same number of half sine wave pulses arranged in a different order than occurs in the other code signals. By designing each decoder circuit to be responsive to a different code signal, a selective calling or paging system is provided. While only one arrangement of the invention in connection with the code signal assigned thereto has been described, the operation of a decoder circuit constructed according to the invention and responsive to a code signal including a different series of half sine wave pulses than that shown in FIGURE 2 is similar to that described above.

While a specific application of the invention is given in FIGURE 2, various modifications may be made without departing from the spirit thereof. A decoder circuit responsive to a code signal including eight half sine wave pulses has been described. This makes the number of possible codes using the binary number system greater than 250 or $2^8$. Code signals including more than or less than eight half sine wave pulses can be readily accommodated by adding to or subtracting from the shift register 35 the desired number of magnetic core stages. As the number of half sine wave pulses included in the incoming code signal is increased, a correspondingly greater number of signal codes are, of course, possible. The number of half sine wave pulses and the resulting number of magnetic cores used in the shift register 35 will depend upon the requirements of the particular application.

The inclusion of the winding 110 on the magnetic core 48 of the read-out gate 19 in either the positive trigger lead 84 or the negative trigger lead 109 depends on the polarity of the read-out pulse following the series of half sine wave pulses. While a positive pulse 62 is assumed to be included in the code signal 60, the read-out pulse 62 could just as well be negative. In the latter case, the winding 110 is connected in the positive trigger lead 84, and the read-out generator 14 is connected to the output of rectifier 73 in the positive shift pulse generator 12 instead of to the output of rectifier 97 in the negative shift pulse generator 13. As pointed out above, the trigger winding 110 on the magnetic core 48 ensures that a "one" state reaching the magnetic core 48 prior to the read-out pulse due to noise or interference is shifted out of the magnetic core 48.

In practice, the terminals 63, 78, 105, 130, 173, 194, 199 and 201 may all be connected to a common source of unidirectional potential such as a battery, means being provided for supplying to the terminals the voltages of proper polarity as indicated in the circuit diagram of FIGURE 2. The on-off switch referred to above can be arranged so as to connect and disconnect the various terminals from the source. It may be practical in certain applications of the invention where it is desired to maintain a zero D.C. average to follow the read-out pulse 62 in each code signal with an equalizing pulse 210, for example, of a negative polarity.

A decoder circuit is disclosed by the invention offering certain definite advantages over similar circuits previously known. By using magnetic cores and transistors in the manner taught by the invention to perform the necessary functions in place of vacuum tubes and other apparatus, a decoder circuit requiring a small power supply is obtained which is small in size, light in weight and capable of high speeds of operation. Because only one magnetic core in the shift register is triggered at a time, very little battery power and low filtering capacity is required. It has been found that somewhat over one milliampere is required. The reception of a correct code signal results in the maximum of core resettings and hence the drawing of the most current. Since in a systems operation, the majority of code signals are incorrect for a particular decoder circuit, a reduced current flow occurs and a saving in battery power results. The discrimination between right and wrong code signals is high and largely independent of the nature of the wrong code signal since the correct code signal sets a single output magnetic core in the right direction but all wrong code signals leave it set incorrectly. Further, as the internal triggering signal power required is relatively small, operation is allowed under widely varying conditions of voltage and internal impedance of the battery source.

In one application, the various doctors, nurses and others who might be called in a hospital may be provided with individual portable lightweight radio receivers each including the decoder circuit of the invention and designed to be carried on the person. The receivers would be provided with the decoder circuit of the invention each arranged to respond to a different code signal. The radio transmitter may be located at a telephone switchboard and provided with means, for example, a dialing system, to transmit the different code signals.

What is claimed is:

1. In combination, an input circuit to which is applied a code signal including a series of pulses of different polarities followed by a control pulse, a storage circuit, means connected between said input circuit and said storage circuit and responsive to said series of pulses only when the pulses in said series are each of a predetermined polarity to establish a given condition in said storage circuit, an output circuit connected to said storage circuit, said means being responsive to said control pulse to operate said storage circuit when said condition is established therein at the time of said control pulse to apply a first output signal to said output circuit, and a further means connected between said input circuit and said output circuit and responsive to said control pulse to apply a second output signal to said output circuit, said output circuit being responsive only to the reception thereby of both said first and said second output signals to produce a third output signal for application to a utilization circuit.

2. In combination, an input circuit to which is applied a code signal including a series of positive and negative pulses followed by a control pulse, a storage circuit, means connected between said input circuit and said storage circuit and responsive to said series of pulses only when said positive and negative pulses are in a predetermined order to establish a given condition in said storage circuit, an output circuit connected to said storage circuit, said means being responsive to said control pulse to cause said storage circuit when said condition is established therein at the time of said control pulse to apply a first output signal to said output circuit, a further means connected between said input circuit and said output circuit and responsive to said control pulse to apply a second output signal to said output circuit, a control circuit connected to said output circuit, said output circuit being responsive only to the reception thereby of both said first and said second output signals to apply a third output signal to said control circuit, said control circuit being arranged to respond to said third output signal to provide an indication that the series of pulses arranged in said predetermined order has been received by said input circuit.

3. A combination as claimed in claim 2 and wherein said storage circuit includes a shift register comprising a plurality of magnetic cores connected as a train of magnetic cores, each of said magnetic cores having a substantially rectangular hysteresis loop such that the core is saturable in either one of two directions, said first-mentioned means including a first shift pulse generator connected to certain ones of said magnetic cores and a second shift pulse generator connected to the remaining ones of said magnetic cores, said second shift pulse generator being arranged to apply a trigger pulse to said remaining ones of said magnetic cores upon the reception by said input circuit of each of said positive pulses, said first shift pulse generator being arranged to apply a trigger pulse to said certain ones of said magnetic cores upon the reception by said input circuit of each of said negative pulses.

4. A combination as claimed in claim 3 and wherein the number of magnetic cores included in said shift register is at least equal to the number of positive and negative pulses plus the control pulse included in said code signal.

5. A decoder circuit comprising, in combination, an amplifier stage to which a code signal including a series of pulses followed by a control pulse is applied, said control pulse having a time duration at least equal to one-half the time duration of said series of pulses, a storage circuit, means connected between said amplifier and said storage circuit and responsive to said series of pulses only when said series of pulses is of a predetermined nature to cause a given condition to be established in said storage circuit, an output circuit connected to said storage circuit, said means being responsive to said control pulse to cause said storage circuit when said condition is established therein at the time of said control pulse to apply a first current pulse to said output circuit, a further means connected between said amplifier and said output circuit and responsive to said control pulse to apply a second current pulse to said output circuit, an alarm device, said output circuit being responsive only to the reception thereby of both said first and said second current pulses to operate said alarm device to indicate the reception by said amplifier stage of the series of pulses of said predetermined nature.

6. A decoder circuit comprising, in combination, an amplifier stage to which a code signal including a series of positive and negative pulses followed by a control pulse is applied, said control pulse having a time duration at least equal to one-half the time duration of said series of pulses, a storage circuit including a shift register comprising a train of magnetic cores at least equal in number to the number of said positive and negative pulses plus said control pulse, each of said magnetic cores having a substantially rectangular hysteresis loop such that the core is saturable in either one of two directions, means connected between said amplifier and said storage circuit and responsive to said series of pulses only when said positive and negative pulses are in a predetermined order to establish a given condition in said shift register of said storage circuit, a gating circuit connected to said storage circuit, said means being responsive to said control pulse to cause when said condition is established in said shift register at the time of said control pulse a first current pulse to be applied from said shift register to said gating circuit, a pulse generator connected between said amplifier and said gating circuit and responsive to said control pulse to apply a second current pulse to said gating circuit, an alarm device, said gating circuit being responsive only to the reception thereby of both said first and said second pulses to operate said alarm device to indicate the reception by said amplifier stage of said series of said positive and negative pulses arranged in said predetermined order.

7. A decoder circuit as claimed in claim 6 and wherein said means includes a first shift pulse generator connected to certain ones of said magnetic cores and arranged to apply a trigger pulse to said certain ones of said magnetic cores upon the reception by said amplifier of each of said negative pulses, said means also including a second shift pulse generator connected to the remaining ones of said magnetic cores and arranged to apply a trigger pulse to said remaining ones of said magnetic cores upon the reception by said amplifier of each of said positive pulses.

8. A decoder circuit comprising, in combination, an input circuit to which a code signal including a series of pulses of different polarity followed by a control pulse is applied, a shift register including a train of magnetic cores each having a substantially rectangular hysteresis loop and two remanent conditions of operation, a first pulse generator connected to said input circuit and responsive to the reception by said input circuit of each of the pulses in said series of one polarity to apply a trigger pulse to certain ones of the magnetic cores in said shift register, a second pulse generator connected to said input circuit and responsive to the reception by said input circuit of each of the pulses in said series of another polarity to apply a trigger pulse to the remaining ones of said magnetic cores in said shift register, said shift register being operated so that upon said pulses of different polarity in said series being arranged in a predetermined order a given condition is established in said shift register, a gating circuit, said first pulse generator being responsive to the leading edge of said control pulse to cause a first current pulse to be applied from said shift register to said gating circuit when said condition is established in said shift register at the time of said control pulse, a third pulse generator connected between said input circuit and said gating circuit and responsive to said control pulse to apply a second current pulse to said gating circuit, an alarm device, said gating circuit being operated only upon the reception thereby of both said first and said second current pulses to operate said alarm device to indicate the reception by said decoder circuit of a code signal including said series of pulses arranged in said predetermined order.

9. A decorder circuit comprising, in combination, an input circuit to which a code signal including a series of pulses of different polarity followed by a control pulse is applied, said control pulse being of a duration at least equal to one-half the time duration of said series of pulses, a shift register including a train of magnetic cores at least equal in number to the number of said pulses of different polarity in said series plus said control pulse, each of said magnetic cores having a substantially rectangular hysteresis loop such that the core is saturable in either one of two directions, a first pulse generator connected to said input circuit and responsive to the reception by said input circuit of each of said pulses in said series of one polarity to apply a trigger pulse to certain ones of the magnetic cores in said shift register, a second pulse generator connected to said input circuit and responsive to the reception by said input circuit of each of said pulses in said series of the opposite polarity to apply a trigger pulse to the remaining ones of said magnetic cores in said shift register, said shift register being operated so that upon said pulses of different polarity in said series being arranged in a predetermined order a given condition is established in said shift register, a gating circuit, said first pulse generator being responsive to said control pulse to cause a first current pulse to be applied from said shift register to said gating circuit when said condition is established in said shift register at the time of said control pulse, a third pulse generator connected between said input circuit and said gating circuit and responsive to said control pulse to apply a second current pulse to said gating circuit, and alarm device, said gating circuit being operated only upon the reception thereby of both said first and said second current pulses to operate said alarm device to indicate the reception by said decoder circuit of a code signal including said series of pulses arranged in said predetermined order.

10. A decoder circuit comprising, in combination, an input circuit to which is applied a code signal including a series of pulses of different polarity followed by a control pulse of given polarity, a shift register including a train of switching devices arranged to be operated so that the first switching device in said train is normally in a given electrical condition, a first pulse generator connected to said input circuit and to certain ones of said switching devices in said train responsive upon the reception by said input circuit of each of said pulses in said series of said given polarity to apply a trigger pulse to said certain ones of said switching devices, a second pulse generator connected to said input circuit and to the remaining ones of said switching devices in said train responsive upon the reception by said input circuit of each of said pulses in said series of the opposite polarity to apply a trigger pulse to said remaining switching devices, said shift register being operated in response to said trigger pulses applied to said switching devices so that said electrical condition is advanced from switching device to switching device through said shift register and is in the last switching device of said train following the reception by said input circuit of a code signal including said series of pulses of different polarity arranged in a predetermined order, an output circuit, said first pulse generator being responsive to the leading edge of said control pulse applied thereto from said input circuit to apply a trigger pulse to said last switching device to cause a first current pulse to be applied from said last switching device to said output circuit when said electrical condition is in said last switching device at the time of said control pulse, a third pulse generator connected between said input circuit and said output circuit and responsive to said control pulse to apply a second current pulse to said output circuit, said output circuit being responsive only to the reception thereby of both said first and said second current pulses to apply an output signal to a utilization circuit.

11. A decoder circuit comprising, in combination, an input circuit to which is applied a code signal including a series of pulses of different polarity followed by a control pulse of given polarity, said control pulse being of a duration at least equal to one-half the time duration of said series of pulses, a shift register including a train of magnetic cores at least equal in number to the number of pulses in said series of pulses plus said control pulse, each of said magnetic cores having a substantially rectangular hysteresis loop such that the core is saturable in either one of two directions, a first pulse generator connected to said input circuit and to certain ones of said magnetic cores including the last magnetic core in said train responsive upon the reception by said input circuit of each of said pulses in said series of said given polarity to apply a trigger pulse to said certain ones of said magnetic cores, a second pulse generator connected to said input circuit and to the remaining ones of said magnetic cores in said train responsive upon the reception by said input circuit of each of said pulses in said series of the opposite polarity to apply a trigger pulse to said remaining magnetic cores, said shift register being operated in response to said trigger pulses applied to said magnetic cores so that only the last magnetic core in said train is saturated in a given one of said directions following the reception by said input circuit of said code signal including said series of pulses of different polarity arranged in a predetermined order, a gating circuit, said first pulse generator being responsive to the leading edge of said control pulse applied thereto from said input circuit to apply a trigger pulse to said last magnetic core to cause a first current pulse to be applied from said last magnetic core to said gating circuit when said last magnetic core is saturated in said given one of said directions at the time of said control pulse, a third pulse generator connected between said input circuit and said gating circuit and responsive to said control pulse to apply a second current pulse to said gating circuit, an alarm device, said gating circuit being responsive only to the reception thereby of both said first and said second current pulses to operate said alarm device to indicate the reception by said decoder circuit of a code signal including said series of pulses arranged in said predetermined order.

12. A decoder circuit comprising, in combination, an input circuit to which is applied a code signal including a series of pulses of different polarity followed by a control pulse of given polarity, said control pulse being of a duration at least equal to one-half the time duration of said series of pulses, a shift register including a train of magnetic cores at least equal in number to the number of pulses in said series plus said control pulse, said magnetic cores each having a substantially rectangular hysteresis loop such that the core is saturable in either one of two directions, the first core in said train being saturated in one of said directions and the other magnetic cores in said train being saturated in the other of said directions, a first pulse generator connected to said input circuit and to certain ones of said magnetic cores including the last magnetic core in said train operative upon the reception by said input circuit of each of said pulses in said series of said given polarity to apply a trigger pulse to said certain ones of said magnetic cores, a second pulse generator connected to said input circuit and to the remaining ones of said magnetic cores in said train operative upon the reception by said input circuit of each of said pulses in said series of the opposite polarity to apply a trigger pulse to said remaining ones of said magnetic cores, said certain ones of said magnetic cores to which said first pulse generator is connected and said remaining ones of said magnetic cores to which said second pulse generator is connected being determined so that the connections to said magnetic cores from said generators correspond with said pulses of different polarity arranged in said series in a predetermined order, said shift register being operated in response to said trigger pulses applied to said magnetic cores so that first one and then another of said magnetic cores is saturated in said one of said directions and only said last magnetic core is saturated in said one of said directions following the reception by said input circuit of a code signal in which said pulses of different polarity are arranged in said series in said predetermined order, a gating circuit including a third pulse generator and an output magnetic core each having two states of operation, means to connect said third pulse generator and said output magnetic core to the last magnetic core in said train, said first pulse generator being responsive to the leading edge of said control pulse to apply a further trigger pulse to said last magnetic core, said last magnetic core being responsive to said further trigger pulse when saturated in said one of said directions at the time of said control pulse to apply a first current pulse to said third pulse generator and to said output magnetic core, said third pulse generator and said output magnetic core each being responsive to said first current pulse to assume a given one of said states of operation, a fourth pulse generator connected to said input circuit and responsive to said control pulse to apply a second current pulse to said third pulse generator and to said output magnetic core following the application to said third pulse generator and said output magnetic core of said first current pulse, said third pulse generator being responsive to said second current pulse only when in said given state of operation at the time of said second current pulse to apply a third current pulse to said output magnetic core, the operation of said fourth pulse generator being determined so that said second current pulse produced thereby is of a duration sufficient to permit said third current pulse to be applied to said output magnetic core at the same time that said second current pulse is being applied thereto, an alarm device coupled to said output magnetic core, said output magnetic core being responsive to the simultaneous application thereto of said second and said third current pulses only when in said given state of operation at the time of said second and third pulses to assume its other state of operation and to apply an output signal to said alarm device, said alarm device being responsive to said output signal to provide an indication of the reception by said decoder circuit of a code signal including said pulses of different polarity in said series arranged in said predetermined order.

13. A decoder circuit as claimed in claim 12 and wherein said alarm device includes a first and second current conducting device connected so as to operate as a monostable multivibrator having a stable state and an unstable state, said multivibrator being arranged to be triggered into its unstable state upon the reception by said alarm device of each of said output signals applied to said alarm device from said output magnetic core and to return to the stable state thereof following a predetermined time interval, indicating means connected to said multivibrator and arranged to be placed in operation during each of said time intervals in which said multivibrator is in said unstable state.

14. A decoder circuit as claimed in claim 12 and wherein said fourth pulse generator is also operated to apply said second current pulse to all of said magnetic cores in said shift register, said magnetic cores being responsive to said second current pulse so that said shift register is returned to its original starting condition in which only said first magnetic core is saturated in said one of said directions.

15. A decoder circuit as claimed in claim 12 and wherein said second pulse generator is also connected to said last magnetic core.

16. A decoder comprising, an input circuit to which is applied a code signal including a series of pulses followed by a control pulse, a storage circuit, means connected between said input circuit and said storage circuit for establishing a given condition in said storage circuit only when the pulses in said series are each of a predetermined polarity, a switching device having two states of operation, a pulse generator connected to said switching device and having two states of operation, means for connecting said device and said generator to said storage circuit, said first-mentioned means being responsive to said control pulse to operate said storage circuit when said condition is established therein at the time of said control pulse to apply a first current pulse to said device and to said pulse generator, said device and said pulse generator each being responsive to said current pulse to assume one of the operating states thereof, a further means connected to said input circuit and responsive to said control pulse to apply a second current pulse to said pulse generator and said device, said pulse generator being responsive to said second current pulse when in said one operating state to assume the other operating state thereof and to apply a third current pulse to said device, the operation of said further means being determined so that said second current pulse is of a duration sufficient to permit the simultaneous application of said second and third current pulses to said device, an output circuit connected to said device, said device being responsive to the application thereto of both said second and third current pulses when in said one operating state to assume the other operating state thereof and to apply an output signal to said output circuit.

17. A decoder as claimed in claim 16 and wherein said switching device is a magnetic core having a substantially square hysteresis loop and a large coercive force threshold, said core being saturable in either one of two directions corresponding to said two states of operation.

18. A decoder circuit comprising, an input circuit to which is applied a code signal including a series of pulses followed by a control pulse, a train of switching devices, pulse generating means connected between said input circuit and the switching devices in said train for establishing a given condition in said train only when the pulses in said series are each of a predetermined polarity, a further switching device connected to the last switching device in said train and having two states of operation, said pulse generating means being responsive to said control pulse to operate said last switching device when said train is in said condition at the time of the control pulse to apply an output pulse to said further switching device, said further switching device being responsive to said output pulse to assume one of the operating states thereof, an output circuit connected to said further switching device, and further pulse generating means connected to said further switching device, to said input circuit and to said last switching device, said further pulse generating means being responsive to said control pulse and to said output pulse to switch said further switching device to the other operating state thereof, whereby said further switching device is operated to apply an output signal to said output circuit.

19. A decoder circuit comprising, in combination, an input circuit including an amplifier stage to which a code signal including a series of pulses of different polarity followed by a control pulse is applied, said control pulse being of a duration at least equal to one-half the time duration of said series of pulses, a shift register including a train of magnetic cores at least equal in number to the number of said pulses of different polarity in said series plus said control pulse, each of said magnetic cores having a substantially rectangular hysteresis loop such that the core is saturable in either one of two directions, a first pulse generator connected to said input circuit and responsive to the reception by said input circuit of each of said pulses in said series of one polarity to apply a trigger pulse to certain ones of the magnetic cores in said shift register, a second pulse generator connected to said input circuit and responsive to the reception by said input circuit of each of said pulses in said series of the opposite polarity to apply a trigger pulse to the remaining ones of said magnetic cores in said shift register, said shift register being operated so that upon said pulses of different polarity in said series being arranged in a predetermined order a given condition is established in said shift register, a gating circuit, said first pulse generator being responsive to said control pulse to cause a first current pulse to be applied from said shift register to said gating circuit when said condition is established in said shift register at the time of said control pulse, a third pulse generator connected between said input circuit and said gating circuit and responsive to said control pulse to apply a second current pulse to said gating circuit, an alarm device, said gating circuit being operated only upon the reception thereby of both said first and said second current pulses to operate said alarm device to indicate the reception by said decoder circuit of a code signal including said series of pulses arranged in said predetermined order, said first, second and third pulse generators each including a transistor device regeneratively connected to a magnetic core having a substantially rectangular hysteresis loop and two remanent conditions, whereby said first, second and third pulse generators each operates as a monocycle oscillator type trigger generator.

20. A decoder circuit comprising, in combination, an input circuit including a transistor amplifier device to which is applied a code signal including a series of pulses of different polarity followed by a control pulse of given polarity, said control pulse being of a duration at least equal to one-half the time duration of said series of pulses, a shift register including a train of magnetic cores at least equal in number to the number of pulses in said series of pulses plus said control pulse, each of said magnetic cores having a substantially rectangular hysteresis loop so that the core is saturable in either one of two directions, a first pulse generator connected to said input circuit and to certain ones of said magnetic cores including the last magnetic core in said train responsive upon the reception by said input circuit of each of said pulses in said series of said given polarity to apply a trigger pulse to said certain ones of said magnetic cores, a second pulse generator connected to said input circuit and to the remaining ones of said magnetic cores in said train responsive upon the reception by said input circuit of each of said pulses in said series of the opposite polarity to apply a trigger pulse to said remaining magnetic cores, said shift register being operated in response to said trigger pulses applied to said magnetic cores so that only the last magnetic core is saturated in a given one of said directions following the reception by said input circuit of said code signal including said series of pulses of different polarity arranged in a predetermined order, a gating circuit, said first pulse generator being responsive to the leading edge of said control pulse applied thereto from said input circuit to apply a trigger pulse to said last magnetic core to cause a first current pulse to be applied from said last magnetic core to said gating circuit when said last magnetic core is saturated in said given one of said directions at the time of said control pulse, a third pulse generator connected between said input circuit and said gating circuit and responsive to said control pulse to apply a second current pulse to said gating circuit, an alarm device, said gating circuit being responsive only to the reception thereby of both said first and said second current pulses to operate said alarm device to indicate the reception by said decoder circuit of a code signal including said series of pulses arranged in said predetermined order, said first, second and third pulse generators each including a transistor device regeneratively connected to a magnetic core having a substantially rectangular hysteresis loop so that the magnetic core is saturable in either one of two directions, whereby said first, second and third pulse generators each operates as a monocycle oscillator type trigger generator.

21. A decoder circuit comprising, in combination, an input circuit including a transistor amplifier stage to which is applied a code signal including a series of pulses of different polarity followed by a control pulse of given polarity, said control pulse being of a duration at least equal to one-half the time duration of said series of pulses, a shift register including a train of magnetic cores at least equal in number to the number of pulses in said series plus said control pulse, said magnetic cores each having a substantially rectangular hysteresis loop so that the core is saturable in either one of two directions, the first core in said train being saturated in one of said directions and the other magnetic cores in said train being saturated in the other of said directions, a first pulse generator connected to said input circuit and to certain ones of said magnetic cores including the last magnetic core in said train operative upon the reception by said input circuit of each of said pulses in said series of said given polarity to apply a trigger pulse to said certain ones of said magnetic cores, a second pulse generator connected to said input circuit and to the remaining ones of said magnetic cores in said train operative upon the reception by said input circuit of each of said pulses in said series of the opposite polarity to apply a trigger pulse to said remaining ones of said magnetic cores, said certain ones of said magnetic cores to which said first pulse generator is connected and said remaining ones of said magnetic cores to which said second pulse generator is connected being determined so that the connections to said magnetic cores from said generators correspond with said pulses of different polarity arranged in said series in a predetermined order, said shift register being operated in response to said trigger pulses applied to said magnetic cores so that first one and then another of said magnetic cores is saturated in said one of said directions and only said last magnetic core is saturated in said one of said directions following the reception by said input circuit of a code signal in which said pulses of different polarity are arranged in said series in said predetermined order, a gating circuit including a third pulse generator and an output magnetic core each having two states of operation, means to connect said third pulse generator and said output magnetic core to the last magnetic core in said train, said first pulse generator being responsive to the leading edge of said control pulse to apply a further trigger pulse to said last magnetic core, said last magnetic core being responsive to said further trigger pulse when saturated in said one of said directions at the time of said control pulse to apply a first current pulse to said third pulse generator and to said output magnetic core, said third pulse generator and said output magnetic core each being responsive to said first current pulse to assume a given one of said states of operation, a fourth pulse generator connected to said input circuit and responsive to said control pulse to apply a second current pulse to said third pulse generator and to said output magnetic core following the application to said third pulse generator and said output magnetic core of said first current pulse, said third pulse generator being responsive to said second current pulse only when in said given state of operation at the time of said second current pulse to apply a third current pulse to said output magnetic core, the operation of said fourth pulse generator being determined so that said second current pulse produced thereby is of a duration sufficient to permit said third current pulse to be applied to said output magnetic core at the same time that said second current pulse is being applied thereto, an alarm device coupled to said output magnetic core, said output magnetic core being responsive to the simultaneous application thereto of said second and said third current pulses only when in said given one of said states of operation at the time of said second and third pulses to assume its other state of operation and to apply an output signal to said alarm device, said alarm device being responsive to said output signal to provide an indication of the reception by said decoder circuit of a code signal including said pulses of different polarity in said series arranged in said predetermined order, said first, second, third, and fourth pulse generators each including a transistor device regeneratively connected to a magnetic core having a substantially rectangular hysteresis loop and two remanent conditions, whereby each of said first, second, third, and fourth pulse generators is arranged to be operated as a monocycle oscillator type trigger generator.

References Cited in the file of this patent

UNITED STATES PATENTS

| | | |
|---|---|---|
| 2,589,130 | Potter | Mar. 11, 1952 |
| 2,708,722 | An Wang | May 17, 1955 |
| 2,734,185 | Warren | Feb. 17, 1956 |
| 2,739,300 | Haynes | Mar. 20, 1956 |
| 2,794,970 | Yostpille | June 4, 1957 |
| 2,803,812 | Rajchman | Aug. 20, 1957 |
| 2,904,626 | Rajchman et al. | Sept. 15, 1959 |
| 2,955,279 | Bode et al. | Oct. 4, 1960 |